United States Patent [19]

Handa et al.

[11] 4,244,862

[45] Jan. 13, 1981

[54] COMPOSITIONS FOR PAINTS AND PRINTING INKS

[75] Inventors: Minoru Handa; Takuzi Nishizawa; Hiroko Ogawa; Shinichiro Asai, all of Machida, Japan

[73] Assignee: Denki Kagaku Kogyo Kabushiki Kaisha, Tokyo, Japan

[21] Appl. No.: 847,525

[22] Filed: Nov. 1, 1977

[30] Foreign Application Priority Data

Feb. 5, 1976 [JP] Japan ................................. 51-11563
Mar. 31, 1977 [JP] Japan ................................. 52-36443

[51] Int. Cl.$^2$ ............................ C08K 3/10; C08L 9/06
[52] U.S. Cl. ................................ 260/42.47; 260/42.21
[58] Field of Search ............. 260/42.22, 880 B, 42.47, 260/42.21

[56] References Cited

U.S. PATENT DOCUMENTS

| | | | |
|---|---|---|---|
| 3,108,994 | 10/1963 | Zelinski et al. | 526/53 X |
| 3,135,716 | 6/1964 | Uraneck et al. | 260/880 B X |
| 3,567,798 | 3/1971 | Haefele et al. | 260/880 B |
| 3,726,824 | 4/1973 | Saunders et al. | 260/880 B X |
| 3,855,189 | 12/1974 | Farrar et al. | 260/880 B X |
| 3,890,408 | 6/1975 | Schepers et al. | 260/880 B X |
| 3,947,536 | 3/1976 | Horiie et al. | 260/880 B X |

*Primary Examiner*—Sandra M. Person
*Attorney, Agent, or Firm*—Sughrue, Rothwell, Mion, Zinn and Macpeak

[57] ABSTRACT

Block copolymers of a vinyl-substituted aromatic hydrocarbon and a conjugated diene, having alkali metal atoms linked to at least one terminal of the polymer chain are obtained by polymerizing vinyl-substituted aromatic hydrocarbon and conjugated diene monomers with use of an alkali metal or organo alkali metal initiator. The block copolymer thus obtained is treated with a polar reactant to introduce polar groups into the polymer chain terminal.

Compositions for paints and printing inks are prepared by incorporating inorganic pigments into the block copolymer having the terminal polar group.

7 Claims, 8 Drawing Figures

4,244,862

COMPOSITIONS FOR PAINTS AND PRINTING INKS

BACKGROUND OF THE INVENTION

This invention relates to compositions for paints and, printing inks having a good coating property and particularly, to compositions for paints and printing inks containing a vinyl-substituted aromatic hydrocarbon/conjugated diene block copolymer as a binder, having good wetting to inorganic pigments and good dispersibility therefor.

Styrene-butadiene type resins have, hitherto, been used as a binder for paints for concrete, vessels and other surfaces and for printing inks, in which such properties as water resistance, chemical resistance and abrasion resistance are required.

Since these styrene-butadiene type resins are usually produced by a radical polymerization method, they have a wide distribution of molecular weight, including a considerable amount of low-molecular weight polymers and, further, have a polymer chain configuration having styrene and butadiene units arranged at random therein. Therefore, a coating or film formed by these resins is markedly deteriorated in mechanical strength and, also, lowered in such properties as water resistance, weather resistance and chemical resistance.

To improve the styrene-butadiene resins film strength, various methods were proposed, but such have provided products unsuitable for use as a binder for paints and printing inks. By way of example, a high impact polystyrene with improved film strength is obtained by grafting polystyrene to elastomeric polymers. However, when this resin is dissolved in a solvent such as xylene and formed to a casting film, elastomer particles deposit out on the film face and, accordingly, the film obtained has an extremely bad appearance. Similarly, with ABS resins obtained by copolymerization with acrylic monomers, when these resins are dissolved in a solvent such as xylene and formed to a casting film, gelled elastomer particles deposit out on the film face and thus the film obtained is markedly deteriorated in the the appearance.

On the other hand, it is known that block copolymers having a regulated molecular configuration are obtained by copolymerizing vinyl-substituted hydrocarbon and conjugated diene monomers by an anionic living polymerization method using an alkali metal or organoalkali metal initiator. It is also known that block copolymers with various properties are obtained by varying the molecular weight, molecular weight distribution and the composition ratio of monomers. For example, with a styrene/butadiene ratio ranging from about 25/75 to 50/50, the resulting block copolymer is a transparent, thermoplastic elastomer, which is used for shoe soles, hot melt adhesives, plastic blends and the like.

Also, block copolymers having a styrene/butadiene ratio of from about 50/50 to 70/30 are a transparent, soft resin and can be used for stretchable films, toy materials and the like.

Further, block copolymers having a styrene/butadiene ratio of from about 75/25 to 90/10 are a rigid, transparent resin, which are improved in mechanical strength such as impact resistance and in properties such as cold resistance.

We have studied styrene-butadiene type resins prepared by anionic living polymerization as a binder for paints and printing inks and, as a result, we have found that coating compositions containing these resins as the binder give a coat or film having a smooth surface without the occurrence of gelling and that these coating compositions are thixotropic, have good coating workability and are anticorrosive. Also, we have found that a printing ink prepared using these resins as a binder is useful for inks exhibiting a delustering, delicate colour tone.

However, block copolymers obtained by anionic living polymerization exhibit poor wetting to inorganic pigments and, accordingly, the dispersibility of pigments in the paint and printing ink compositions is deteriorated. Therefore, in the case of using compositions having a practical concentration of pigments, the resulting film or coat is considerably deteriorated in properties such as gloss and water resistance as compared with the case of using compositions prepared using copolymer resins obtained by radical polymerization.

Thus, styrene/butadiene copolymers obtained by living polymerization are highly superior in the mechanical and chemical strength of the resin itself to those obtained by radical polymerization, but are nevertheless limited to a particular field of use for paint and printing ink composition.

U.S. Pat. Nos. 3,108,994 and 3,135,716 disclose a method for the production of a terminally reactive polymer by reacting living polymers with a suitable reactant, in which mercapto, hydroxy or acidic groups are introduced as a reactive group, and the resulting terminally reactive polymer is used for cross linking.

Also, dispersions of titanium dioxide particles in toluene stabilized by partially carboxylated styrene-butadiene block copolymer are reported in Advan. Chem. Ser., Vol. 99, PP 379–396 (1971), "Dispersion of Solid Particles in Organic Media" by G. E. Molan and E. H. Richardson. The carboxylation is effected by adding thioglycolic acid to the main chain of the polymer.

SUMMARY OF THE INVENTION

An object of this invention is to provide paint and printing ink compositions comprising a vinyl-substituted aromatic hydrocarbon/conjugated diene block copolymer obtained by anionic living polymerization and inorganic pigments, which copolymer has good wetting of the pigments and good dispersibility thereof.

Another object of this invention is to provide paint and printing ink compositions comprising a vinyl-substituted aromatic hydrocarbon/conjugated diene block copolymer and inorganic pigments, which form a film or coat improved in properties such as gloss, water resistance and weather resistance.

We have now found that block copolymers containing no polar groups in the polymer chain, which are obtained by anionic living polymerization, exhibit poor wetting of pigments and, also, the dispersion stability thereof is reduced, and that the wetting of pigments and dispersibility thereof are remarkably improved by introducing a limited amount of polar groups into said copolymer at its chain terminals.

In accordance with this invention, there are provided compositions for paints and printing inks comprising: (A) a vinyl-substituted aromatic hydrocarbon/conjugated diene block copolymer comprising polymers having polar groups introduced into terminals of the polymer chain, which is obtained by reacting a vinyl-substituted aromatic hydrocarbon/conjugated diene block copolymer having alkali metal atoms linked to at least one terminal of the polymer chain with a polar reactant capable of reacting with the alkali metal atom, said block copolymer having the terminal alkali metal atoms being obtained by polymerizing vinyl-substituted aromatic hydrocarbon and conjugated diene monomers with use of an alkali metal or organo alkali metal initiator and, (B) at least one inorganic pigment.

DETAILED DESCRIPTION OF THE INVENTION

Figure 1:
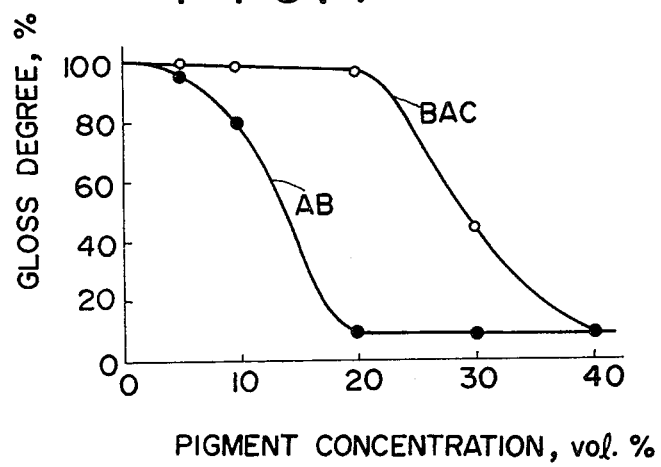
FIG. 1 is a graph showing the relation between pigment concentration and film gloss for styrene/butadiene block copolymers having polar groups introduced into the polymer chain terminal.

According to this invention, when polar groups containing oxygen, nitrogen or sulphur are introduced into the terminals of polymers obtained by an anionic living polymerization, wetting of the resulting polymers of pigments is remarkably increased and, surprisingly, a remarkable improvement of dispersibility of inorganic pigments can be found though the amount of polar groups contained in the total polymers is quite a small. Moreover, a remarkable effect can be also attained in improving various physical properties such as gloss and water resistance of a coated film of coating compositions obtained by compounding a pigment at a practical concentration with such polymers. Further, in the case of using the resin as a binder of a composition for a printing ink, it is recognized that remarkable effects can be attained in improving the mechanical strength and gloss of the coated film and the storage stabilization of the ink formed therefrom.

The vinyl-substituted aromatic hydrocarbon which may be used includes, for example, styrene and various alkyl styrenes such as α-methyl styrene, vinyl toluene, tert.-butyl styrene and similar materials and mixtures thereof. Also, the conjugated dienes which may be used include, for example, butadiene, isoprene and similar materials and mixtures thereof. Moreover, the polymer which may be used in this invention is a block copolymer consisting of polymers of the above-mentioned monomers, which can be from a soft to a hard resinous polymer having a block structure as shown below.

The composition ratio of vinyl-substituted aromatic hydrocarbon to conjugated diene in the block copolymer is not particularly limited, but ratios of about 50–95 to 50–5 are preferable.

The structures of the block copolymers are represented by $(A-B)_n$, $(A-B)_n-A$, and $(A-B)_nX$, wherein A is a polymer comprising mainly vinyl-substituted aromatic hydrocarbon units, and B is a polymer comprising mainly conjugated diene units.

However, it may be permitted that a small amount of conjugated diene is copolymerized with sequence A and a small amount of vinyl-substituted aromatic hydrocarbon is copolymerized with sequence B. n is an integer of 1 to 10 and X is a residue of a coupling agent having more than two functional radicals or of a polyfunctional polymerization initiator. Sequences A and B of the above-mentioned structure may be linked by a clearly cut linkage and, also, may be in the form of a tapered copolymer which is disclosed in U.S. Pat. No. 3,947,536.

Alkali metals which may be used as polymerization initiators include, for example, lithium, sodium, and potassium. Further, as organo alkali metal compounds, naphthalene complexes of a metal such as lithium, sodium and potassium, or alkyl or aryl alkali metal compounds such as butyl lithium can be used. Moreover, polyfunctional initiators such as organodilithium compounds and organopolylithium compounds may be used.

In the case that polymerization is carried out using an organic monolithium compound, polymers produced by treating with a polar reactant have a structure such that the polar group is introduced into only one terminal of the polymer chains, while in the case of using an organodilithium compound, polymers produced by reacting with a polar reactant after polymerization have a structure such that polar groups are linked to both terminals of the polymer chains.

Further, in the case of employing a polyfunctional initiator, branched star polymers are produced, and polymers prepared by reacting the branched star polymers with a polar reactant have a structure such that polar groups are introduced at each terminal of the branched polymer chains of the star polymers. Further, in the case of polymers prepared by effecting polymerization by using an organomonolithium initiator, treating the resulting polymers with a polyfunctional coupling agent, and then treating the thus produced star polymers with a polar reactant, polar groups are introduced into near the center of the polymer chain.

In this invention, polymers containing polar groups at their chain terminals include all polymers containing polar groups at at least one molecular terminal of polymers having various block structures, which are prepared by polymerization using an initiator and reaction with a polar reactant. However, the effects of the terminal polar group vary depending on the structure of the block copolymer and the content of polymers having terminal polar groups in the total polymers. For example, in the case that polymerization is carried out using a polyfunctional initiator to introduce polar groups into many terminals of polymer chains, it has been found that the effects of the introduced polar groups become more remarkable than that in the case of introducing a polar group into only one terminal.

It has also been found that polymers containing a polar group at the center of the polymeric chain, which are produced by linking a linear polymer with a polyfunctional coupling agent, for example divinyl benzene, to prepare a star polymer, and reacting the star polymer with a polar reactant provide a smaller effect due to the polar group than polymers containing polar groups at polymer chain terminals.

Block copolymers in this invention may be produced in an inert atmosphere, in the presence of a polymerization solvent.

The solvents which may be used includes benzene, cyclohexane, toluene, xylene ethylbenzene, tetrahydrofuran, ethylcyclohexane, methylcyclohexane and mixtures thereof. Any solvents other than the foregoing, in which an anionic living polymerization can be carried out, may also be employed.

Further, the polymerization temperature may be selected appropriately.

Polar reactants which may be used in this invention include materials capable of reacting with the terminal alkali metal, thereby imparting a hydrophilic polar group containing oxygen, nitrogen or sulphur into the polymer chain terminal(s).

Examples of these oxygen-, nitrogen- or sulphur-containing reactants are as follows:

(1) Reactants for introducing a carboxyl radical; Carbon dioxide.
(2) Reactants for introducing a hydroxyl radical; Oxygen, sulphur dioxide, ethylene oxide, propylene oxide, styrene oxide, aldehydes, ketones, halohydrine and diepoxybutane.
(3) Reactants for introducing a thiol radical; Sulphur, carbon disulfide and alkylene sulfides
(4) Reactants for introducing an amino radical; Alkyleneimines.
(5) Reactants for introducing a sulfone radical; Sulfuryl chloride.
(6) Reactants for adding acid anhydrides; Maleic anhydride, succinic anhydride and phthalic anhydride.
(7) Other reactants for adding polar compounds: Phosgen, thionyl chloride, cyanogen halides, cyanogen, toluene 2,4-diisocyanate, cyclic disulfides, p-bromoaniline, ethyl adipate and ethyl sebacate.

Further, a polar group can be introduced by polymerizing an anionically polymerizable polar monomer in an amount of several molecules to vinyl-substituted aromatic hydrocarbon-conjugated diene block copolymers at their polymer chain terminals.

Examples of these polar monomers are epoxides such as ethylene oxide and propylene oxide; alkylene sulfides such as ethylene sulfide and propylene sulfide; acrylates such as isopropyl acrylate; methacrylates such as methyl methacrylate, ethyl methacrylate, hexyl methacrylate and allyl methacrylate; vinyl pyridine; siloxanes such as hexamethylcyclotrisiloxane, octamethylcyclotrisiloxane and octamethylcyclotetrasiloxane; 1,2-dihydronaphthalene, 1-methacryloxy-2-butyne and formaldehyde.

As a reference to such polar reactants there is, for example, "Synthesis of Block Polymers by Homogeneous Anionic Polymerization" L. J. Fetters, J. Polymer Sci. Part C, No. 26, pp 1–35 (1969).

Polar groups thus introduced into polymer chain terminals have great effect even though they are not introduced to all the terminals.

For example, in the reaction of polymers containing terminal alkali metal with polar reactants, a side reaction such as coupling between polymer molecules may occur in some cases depending on reaction conditions, e.g. type of polar reactants, structure of polymers, solvents, reaction temperature and reaction vessel. When such a coupling reaction occurs, polar groups come to be introduced at the center of polymer chains.

Further, when the coupling reaction takes place during reaction with the polar reactant after the polymerization using a polyfunctional initiator, the resulting polymers are allowed to gel so that the reaction amount between the polymer containing terminal alkali metal and the polar reactant is extremely reduced. One of the characteristics of this invention, however, is that the effects of introducing polar groups can be attained when polar groups are introduced into at least a part of the polymer chain terminals even though not introduced into all of the terminals due to a side reaction such as a coupling reaction. For example, when an anionic living polymerization is carried out in benzene using an organodilithium initiator to obtain polymers containing alkali metals at both terminals and then polar groups are introduced by feeding carbon dioxide gas into the resulting polymer solution at about room temperature, the polymer solution is immediately allowed to gel so that polar groups cannot be introduced into all of the terminals of the polymer chain.

Thus, the amount of polar groups introduced by such a method is extremely small in general.

It has, however, been found that the effects of the introduced polar groups become remarkable, if polymers containing terminal polar groups are more than about 4% by weight of the total polymers.

Moreover, when a living polymerization accompanied with a side reaction such as chain transfer is carried out in a polymerization solvent such as toluene and then a polar reactant such as carbon dioxide gas is fed into the resulting polymer solution, the amount of polar groups introduced into terminals of the polymer chain is quite small.

However, even in such a case, it has been found that the effects of the introduced polar groups are remarkable, if polymers containing terminal polar groups are more than about 4% by weight of the total polymers.

It is theoretically possible to prepare polymers having polar groups terminally introduced up to 100% by weight, though the content of polymers containing terminal polar groups is usually within the range of about 4 to 60% by weight of the total polymers.

These polymers containing terminal polar groups can be produced by various methods.

For example, polymers having lithium carboxylate at both terminals can be produced by polymerizing styrene with butadiene in xylene in a nitrogen atmosphere by use of an alkyl dilithium initiator and feeding carbon dioxide gas into the resulting polymer solution.

The polymer solution thus obtained may be compounded with pigments to prepare coating compositions. Before preparation, however, it is desirable to add an excess of water or alcohols or other Lewis acids to the polymer chain terminals to reduce the viscosity of the polymer solution.

Further, the thus produced polymers may be separated by precipitating with methanol or steam stripping and taken out as dried powders to prepare a coating composition.

As inorganic pigments to be compounded, there are various metals, metal oxides, metal sulfates, chromates, metal carbonates and others. Examples thereof are titanium oxide, zinc white, white lead, lithopone, white alumina, precipitated barium sulfate, finely powdered silicic acid, iron black, read oxide, silver vermilion, red copper oxide, molybdate chrome orange, chrome yellow, zinc chromate, chromium oxide, prussian blue, ultramarine, aluminium powder and so on.

Carbon black provides the same effects as the metal oxides.

Compounding is carried out in an organic solvent by means of a conventionally employed stirrer, such as a ball mill and Attritor mill.

The amount of the inorganic pigment is properly adjusted depending on the objective coated film, molecular weight of the polymer having polar groups and materials to be compounded. Generally, pigment concentration is within the range of 5 to 80% by volume, preferably 10 to 50% by volume. Solvents for a coating composition are not particularly limited, but non-polar solvents provide especially desirable effects. They include, for example, vinyl aromatic compounds such as xylene, ethylbenzene, and toluene, alicyclic compounds such as ethylcyclohexane and methylcyclohexane, and other materials such as petroleum solvents exemplified by mineral spirits.

The coating composition containing these solvents has moderate thixotropy and storage stability (hardly separated). Any solvents which can dissolve resins, of course, may be used and it is possible to use mixtures thereof, too.

This invention will be illustrated by the following Examples.

EXAMPLE 1

An AB type block copolymer (A: polystyrene, B: polybutadiene) was produced by an anionic living polymerization in a nitrogen atmosphere using benzene as the polymerization solvent and secondary-butyl lithium as the initiator. As the polymerization vessel a glass autoclave having a capacity of 2 l was used. 1200 g. of well dried benzene and 255 g. of styrene were fed into the autoclave and, further, 45 g. of purified butadiene were dissolved in the benzene-styrene mixture solution. A solution of 6.0 millimoles of secondary-butyl lithium in heptane was added while maintaining the temperature in the polymerization vessel at 20° C.

The temperature was raised to 60° C.

After about 60 minutes, polymerization of butadiene and styrene was completed and the contents were colored red. Further, a BAC type block copolymer containing terminal carboxyl groups (C: carboxyl group) was produced by feeding into the above red solution of the AB type block copolymer carbon dioxide gas at a flow rate of about 10 l per minute. Polymer powders were prepared by separating polymers from the polymer solution steam stripping.

As a result of analysis, it was found that both the AB type and BAC types block copolymers were block copolymers having a number average molecular weight of $5 \times 10^4$, consisting of 85% by weight of polystyrene and 15% by weight polybutadiene. For the BAC type block copolymer, polymers containing terminal carboxyl groups were about 50% of the total polymers, according to thin layer chromatography. Also, according to NMR analysis both of the AB type and BAC type block copolymers were tapered block copolymers with a small portion of styrene-butadiene random copolymers Next, two compositions were prepared by mixing each of the above AB type and BAC type block copolymers with titanium oxide (rutile structure) and xylene by means of a ball mill for about 10 hours. Each of the two compositions was applied on a well washed steel plate by means of a film applicator and dried at room temperature for two weeks. Specular reflectance at 60° (gloss degree) was measured for the coated films. The results are given in FIG. 1. It is clear from FIG. 1 that the polymer containing terminal carboxyl groups (Curve BAC) was superior in film gloss to the polymer containing no terminal carboxyl group (Curve AB).

EXAMPLE 2

Three BAC type block copolymers containing terminal polar groups and having number average molecular weights of $3 \times 10^4$, $5 \times 10^4$ and $10 \times 10^4$, respectively, composed of 85% by weight of styrene and 15% by weight of butadiene were produced varying the amount of the initiator by the same anionic living polymerization as in Example 1.

For comparison, three BA type block copolymers containing no terminal carboxyl group, of the same composition as the BAC type, and having number average molecular weights of $3 \times 10^4$, $5 \times 10^4$ and $10 \times 10^4$, respectively, were produced in the same manner as in Example 1. Each copolymer was compounded with a tiatnium oxide pigment (rutile structure) and xylene by means of a ball mill according to the same method as in Example 1. The relation between pigment concentration and film gloss was measured. The results are shown in FIG. 2.

Figure 2:
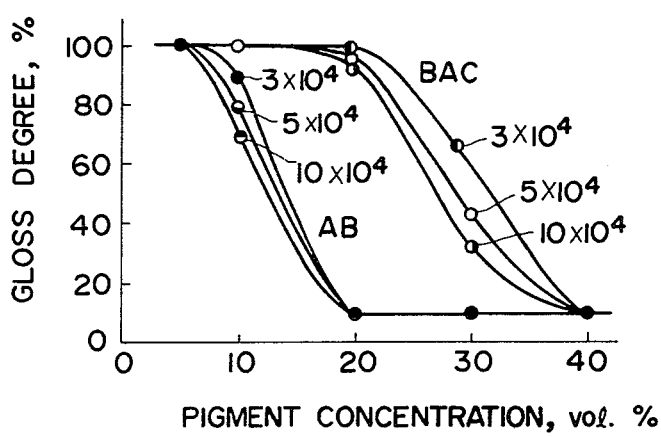
FIG. 2 is a graph showing the relation between pigment concentration and film gloss for styrene/butadiene block copolymers having different molecular weights.

It is apparent from FIG. 2 that in the case of copolymers having different molecular weights, the BAC type polymers containing a carboxyl group at one terminal of the polymer have superior film gloss to that of the AB type polymers containing no polar group, at the same concentration of pigment.

EXAMPLE 3

(1) BAC type tapered block copolymers containing terminal carboxyl groups and having a number average molecular weight of 50,000, composed of 85% by weight of styrene and 15% by weight of butadiene, and AB type tapered block copolymers containing no terminal polar group, but of the same composition, were produced according to the same anionic living polymerization as in Example 1.

(2) CABAC type tapered block copolymers containing carboxyl groups at both terminals of the polymer and having a number average molecular weight of 50,000, composed 85% by weight of styrene and 15% by weight of butadiene, and ABA type tapered block copolymers containing no terminal polar group, but of the same composition, were produced employing a butadiene oligomer dilithium initiator by the same anionic living polymerization as in Example 4.

(3) A star polymer was prepared by producing a linear polymer using benzene and secondary-butyl lithium initiator in a nitrogen atmosphere, and adding a coupling agent.

The polymerization was carried out in a glass autoclave having a capacity of 2 l. 1200 g. of well dried benzene and 255 g. of styrene were fed while maintaining the temperature in the autoclave at 20° C., and further a solution of 60 millimols of sec-butyl lithium in heptane was added. As soon as the temperature was elevated to 60° C., the polymerization of styrene advanced and the contents turned to red.

After the temperature was reduced to 20° C., 45 g. of purified butadiene were blown into the polymer solution. The temperature was elevated to 60° C. and maintained for 2 hours. The polymer solution turned slightly yellow. Then, 480 millimols of a 10% benzene solution of well dried divinyl benzene were fed into the polymer solution while stirring. The contents in the autoclave became deep red and coupling of linear polymers ocured, to thereby yield an (AB)$_{10}$ type star block copolymer.

Next, after the above deep red polymer solution was heated up to about 80° C., carbon dioxide gas was blown therein at a flow rate of about 20 l per minute, to yield a star block copolymer containing carboxyl groups. According to the results of analysis, the thus produced (AB)$_{10}$ type and (ABC)$_{10}$ type star block copolymers were poly-branched block copolymers having a number average molecular weight of $5 \times 10^4$, and were composed of of 85% by weight polystyrene and 15% by weight polybutadiene.

(4) Into the above-mentioned AB type tapered block copolymer, ABA type tapered block copolymer, (AB)$_{10}$ type star block copolymer, BAC type tapered block copolymer, CABAC type tapered block copolymer and (ABC)$_{10}$ type star tapered block copolymer, respectively, were added a pigment (titanium oxide: rutile structure) and a diluent (xylene), and compounding was carried out in the same manner as in Example 1. The relation between pigment concentration and film gloss is shown in FIG. 3.'

Curve a: AB type block copolymer,
Curve b: ABA type block copolymer,
Curve c: (AB)$_{10}$ type block copolymer,
Curve d: BAC type block copolymer,
Curve e: CABAC type block copolymer,
Curve f: (ABC)$_{10}$ type block copolymer.

Figure 3:
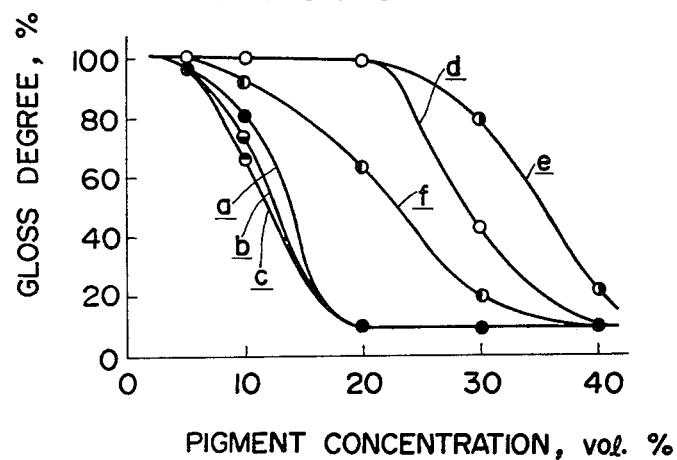
FIG. 3 is a graph showing the relation between pigment concentration and film gloss for block copolymers having different molecular structures.

FIG. 3 shows that polymers containing no polar group (Curves a, b and c) are reduced in film gloss at practical concentrations of the pigment; among polymers containing carboxyl groups, the CABAC type polymers (Curve e) containing carboxyl groups at both terminals of the polymers have the highest gloss; and film gloss becomes lower in the order of the BAC type polymers (Curve d) and the (ABC)$_{10}$ type polymers (Curve f).

It is clear from these facts that the introduction of polar groups into both terminals of polymers is more suitable than that into one terminal of polymers, and the introduction of polar groups into terminals of a linear polymer chain exhibits more desirable effects on film gloss than into the center of star polymers.

EXAMPLE 4

ABA type polymers were produced by effecting an anionic living polymerization in a nitrogen atmosphere, employing xylene as the polymerization solvent and butadiene oligomer dilithium initiator.

As the polymerization vessel, a glass autoclave of 2 l capacity was used. 1200 g. of well dried xylene and 255 g. of a styrene were charged. Further, 45 g. of a purified butadiene were dissolved therein. The temperature in the autoclave was kept at 20° C., and a solution of 6.0 millimols of butadiene oligomer dilithium in benzene was added. The temperature was elevated to 60° C. After about 30 minutes, polymerization of butadiene and styrene was completed and the solution was colored red.

Moreover, CABAC type block copolymers containing a carboxyl group at both terminals of the polymer chain were prepared by heating the above-mentioned red polymer solution of ABA type block copolymers at about 100° C., feeding carbon dioxide gas at a flow rate of 20 l per minute and pouring the resulting polymer solution in a large amount of methanol to precipitate the polymers.

According to the results of analysis, the thus prepared ABA type and CABAC type block copolymers are block copolymers having a number average molecular weight of $5 \times 10^4$, consisting of 85% by weight polystyrene and 15% by weight polybutadiene. For the CABAC type block copolymer, polymers containing terminal carboxyl groups comprised about 50% of the total polymers, according to thin layer chromatography. It was found from the results of NMR analysis that any of the ABA type and CABAC type block copolymers were tapered block copolymers containing a considerable amount composed of styrene-butadiene random copolymer.

Next, using each of the above CABAC type and ABA type block copolymers, two compositions were prepared with the formulations as described hereunder in the same manner as in Example 1.

|  | Parts by weight |
|---|---|
| Block copolymers | 77 |
| Titanium oxide, rutile structure | 63 |
| Xylene | 178 |
| Pigment concentration : 15% by volume | |

Each of the composition thus prepared was applied on a well washed steel plate by means of a film applicator, and the coated film was dried at room temperature.

Figure 6:
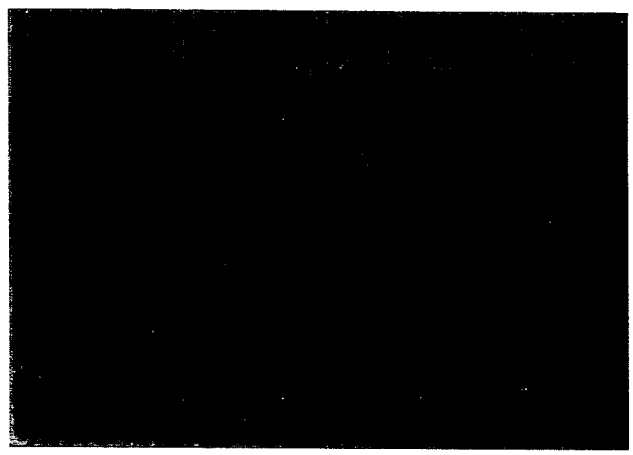
FIG. 6 is a microphotograph of titanium oxide (rutile structure) used as a pigment.
Figure 7:
FIG. 7 is a microphotograph of a film formed by a coating composition of polymers containing no terminal polar groups and titanium oxide.
Figure 8:
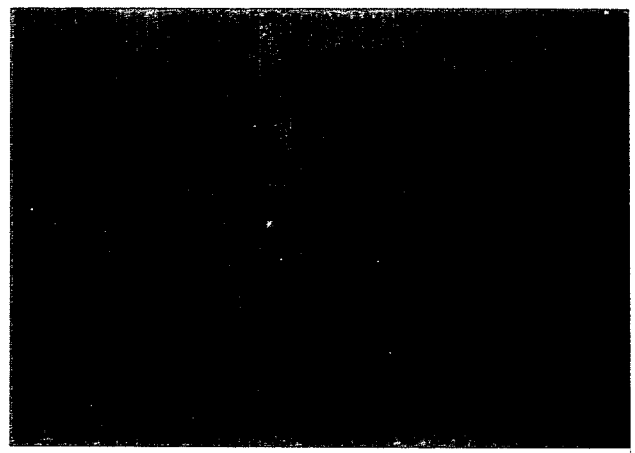
FIG. 8 is a microphotograph of a film formed by a coating composition of polymers containing terminal carboxyl groups and titanium oxide.

FIG. 6 relates to a microscopic photograph ($\times 10^3$) of titanium oxide (rutile structure), and FIG. 7 and FIG. 8 relate to microscopic photographs ($\times 10^3$) of the coated films obtained from polymers having no terminal polar group and polymers having terminal carboxyl groups, respectively.

Gloss degrees of the coated films are shown in Table 1.

Table 1

|  | gloss degree % |
|---|---|
| ABA type block copolymer | 30 |
| CABAC type block copolymer | 100 |

The gloss degree in Table 1 is indicated by specular reflectance at 60° according to the method of JISK 5400.

It is apparent from Table 1 and FIGS. 7 and 8 that the coated film prepared from polymers containing no polar groups has low gloss, and particles of the pigment are aggregated in the coated film, while the coated film prepared from polymers containing terminal carboxyl groups has high gloss and particles of the pigment are uniformly dispersed in the coated film.

EXAMPLE 5

Into a red benzene solution containing living polymers consisting of AB type tapered block copolymers produced according to the same method as in Example 1 was blown carbon dioxide gas at about room temperature to thereby produce BAC type polymers containing —COOM groups (M is Li metal or hydrogen) at terminals of the polymer chain.

Also, polymers containing —OM groups at terminals of the polymer were produced by blowing a gaseous mixture of oxygen and nitrogen into a benzene solution containing living polymers consisting of AB type tapered block copolymers produced in the same manner as above.

Similarly, polymers containing —SM groups at polymer terminals were produced by adding a 10% benzene solution of carbon disulfide into a benzene solution containing living polymers consisting of AB type tapered block copolymers.

Similarly, polymers containing an average of five molecules of vinyl pyridine at polymer terminals were produced by adding a 10% benzene solution of 2-vinyl pyridine into a benzene solution containing living polymers consisting of AB type tapered block copolymers.

Similarly, polymers containing —$C_3H_6Si(OCH_3)_3$ groups at the polymer terminals were produced by adding a 10% benzene solution of γ-chloropropyl trimethoxy silane into a benzene solution containing living polymers consisting of AB type tapered block copolymers.

Figure 4:
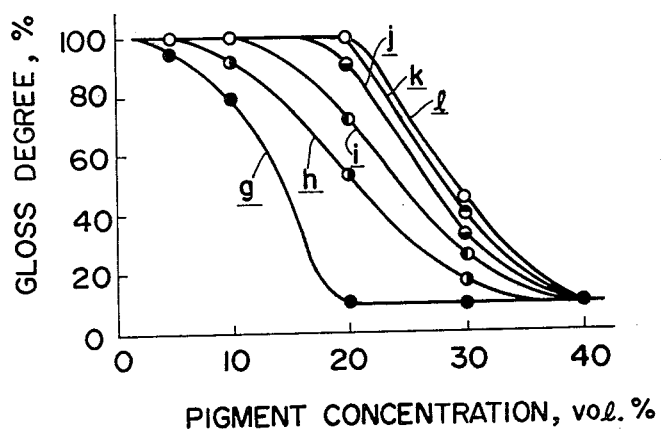
FIG. 4 is a graph showing the relation between pigment concentration and film gloss for block copolymers having different polar groups introduced into the polymer chain terminal.

A pigment (titanium oxide:rutile structure) and a diluent (xylene) were added to the above-mentioned AB type tapered block copolymer having a number average molecular weight of 50,000, composed of 85% by weight styrene and 15% by weight butadiene, and to the above-mentioned five polymers containing polar groups at polymer terminals, of the same composition and molecular weight as the AB type, respectively. Compounding was carried out in the same manner as in Example 1. The relation between pigment concentration and film gloss is shown in FIG. 4.

Curve g: Block copolymer containing no terminal polar groups,
Curve h: Block copolymer containing terminal —$C_3H_6Si(OCH_3)_3$ group,
Curve i: Block copolymer containing terminal —SM group,
Curve j: Block copolymer containing terminal vinyl pyridine molecules,
Curve k: Block copolymer containing terminal —OM group,
Curve l: Block copolymer containing terminal —COOM group.

It is clear from the figure that polymers containing terminal polar groups are highly superior in film gloss to polymers containing no terminal polar group at practical concentrations of the pigment, i.e., it may be said that dispersibility of a pigment in any polymer containing terminal polar groups is more excellent than that of the pigment in polymers having no terminal polar group.

EXAMPLE 6

AB type tapered block copolymers containing no terminal polar group were produced by the same method as in Example 1.

Next, into the thus obtained benzene solution containing living copolymers was fed carbon dioxide gas under such conditions that the content of polymers containing terminal carboxyl groups reached 2%, 5%, 10% and 50%, respectively, based on the total polymers.

Figure 5:
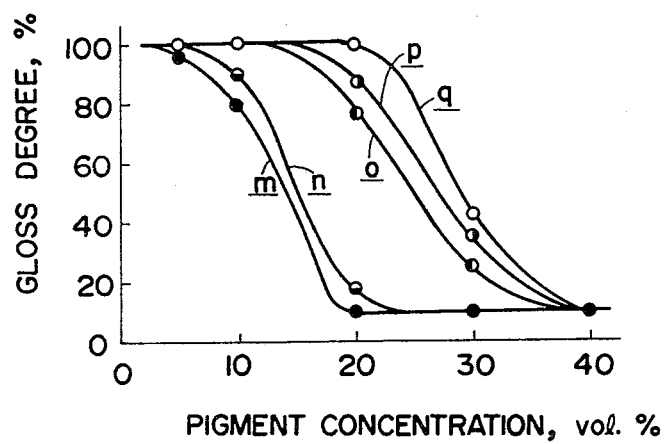
FIG. 5 is a graph showing the relation among pigment concentration, film gloss and content of polymers having polar groups introduced into the polymer chain terminal for block copolymers.

These polymers were compounded with titanium oxide (rutile structure) and xylene in the same manner as in Example 1. In respect of the compositions, the relation between pigment concentration and film gloss is shown in FIG. 5.

Curve m: Block copolymer containing no terminal carboxyl group,
Curve n: Content of polymers containing terminal carboxyl groups, 2%
Curve o: do, 5%
Curve p: do, 10%
Curve q: do, 50%

It is clear from the figure that the film gloss becomes higher as the content of polymers containing terminal carboxyl groups increases.

Further, when the content of polymers containing terminal carboxyl groups is near 2% of the total polymers, the effect on film gloss is not noticeable but it becomes considerably remarkable in case of more than about 4%, as is seen.

EXAMPLE 7

The BAC type and AB type block copolymers produced in Example 1, and a polymer of the same composition, having the same viscosity at a 10% xylene solution of polymer (B type viscosimeter, at 25° C.), which was produced by a radical emulsion polymerization method were used for the following formulation:

|  | Parts by weight |
|---|---|
| Polymers | 20 |
| Titanium oxide (rutile structure) | 20 |
| zinc white | 2.0 |
| Disparlon D4200 | 0.2 |
| (Dispersing agent of polyethyleneoxide type) | |
| Chlorinated paraffin | 10 |
| (Chlorine content 40%) | |
| Xylene | 48 |

The preparation was carried out by means of a ball mill for about 10 hours. Each of the three compositions thus obtained was applied onto a well washed steel plate by means of a film applicator, and dried at room temperature for two weeks. Thereafter, various performance tests on the coated film were effected. The results are shown in Table 2.

Table 2

|  | A*1 | B*2 | C*3 |
|---|---|---|---|
| Specular gloss at 60° C., % | 100 | 40 | 100 |
| Adhesion to the substrate*4 | Good | Quite bad | Good |
| Impact resistance*5 | Good | Good | Quite bad |
| Resistance to salt water*6 (3% salt water, 200 hours) | Good | Quite bad | Bad |
| Resistance to salt-fog*6 (5% salt water spray, 200 hours) | Good | Quite bad | Bad |
| Accelerated weather resistance*6 (60° C., carbon arc, 100 hours) | Good | Good | Quite bad |

Notes:
*1Coated film of the composition of polymers containing termnal polar groups.
*2Coated film of the composition of polymers containing no terminal polar group.
*3Coated film of the composition of polymers which were prepaed by a radical emulsion polymerization.
*4Measued according to a cross-cut adhesion test.
*5Measured by dropping a steel ball of 6.35 mmφ on a steel plte of 1 mm thickness coated with a test film from 50 cm high and rating change of the film with the naked eye.
*6Rated by observing the film surface with the naked eye.

As is clear from Table 2, the coated film of this invention is quite superior in gloss, adhesion to the substrate, saline solution resistance, and salt-fog resistance to the coated film composed of copolymers containing no terminal polar group.

Further, it is apparent that the coated film of this invention has quite excellent impact resistance and accelerated weather resistance, and also has excellent saline solution resistance and saline solution spray resistance, compared with the coated film composed of styrene-butadiene copolymers produced according to a radical emulsion polymerization method.

EXAMPLE 8

The BAC type and AB type block copolymers produced in Example 1, and a random copolymer of the same composition having the same viscosity as a 30% xylene solution of polymer (300 cps, B type viscosimeter at 20° C.), which was produced by a radical polymerization were used, respectively, as a binder for a blue ink.

Using phthalocyanine blue as a pigment, three compositions were prepared by means of a ball mill according to the following formulation.

|  | Parts by weight |
| --- | --- |
| Pigment (phthalocyanine blue) | 3 |
| Calcium carbonate | 10 |
| Polymer | 20 |
| Solvent (xylene) | 67 |

The ink compositions thus obtained have physical properties as set forth in Table 3.

Table 3

| | Copolymers | | |
| --- | --- | --- | --- |
| Items | BAC type | AB type | Radical polymzn. products |
| Storage stability (after one day) | Good | Good | Quite bad |
| Storage stability (after one week) | Good | Quite bad | Quite Bad |
| Film strength | Good | Good | Quite bad |
| Film gloss | Good | Quite bad | Good |
| Hiding power | Good | Quite bad | Quite bad |
| Graininess | Not found | Found | Not found |

In the ink comprising the radical polymerization product, precipitates of white calcium cabonate were observed one day after the preparation of the blue ink. The blue ink comprising the AB type block copolymers as the binder, one week after the preparation, separated into two layers; i.e. a colorless transparent, upper layer and a blue, lower layer. From the above table, it is apparent that the BAC type block copolymer containing terminal carboxyl groups has the best storage stability as a binder. Further, the blue ink comprising block copolymers containing terminal carboxyl groups exhibits the best performance in film strength, film gloss, hiding power and graininess in ink, as shown in Table 3.

What is claimed is:

1. Compositions for paints and printing inks comprising a binder matrix in which at least one inorganic pigment is disposed, wherein the binder matrix comprises:
a vinyl-substituted copolymer comprising at least one polymer having a polar group introduced into at least one terminal of the molecular chain, which is obtained by reacting a vinyl-substituted aromatic hydrocarbon/conjugated diene block copolymer having at least one alkali metal atom linked to at least one terminal of the molecular chain with a polar reactant capable of reacting with the alkali metal atom, said block copolymer having said at least one terminal alkali metal atom being obtained by polymerizing vinyl-substituted aromatic hydrocarbon and conjugated diene monomers using an alkali metal or organo alkali metal initiator, said copolymer having polar groups introduced into said terminals having good wetting to pigments and good dispersibility of pigments thereon, wherein said at least one polymer containing at least one terminal polar group comprises more than about 4% by weight of the total polymer present.

2. Compositions for paints and printing inks of claim 1 wherein the block copolymer is represented by the structure $(A-B)_n$, $(A-B)_n-A$ or $(A-B)_nX$, wherein A stands for a polymer consisting mainly of a vinyl-substituted aromatic hydrocarbon, B stands for a polymer consisting mainly of a conjugated diene, n is an integer of 1 to 10 and X stands for a residue of a coupling agent having two or more functional radicals or of a polyfunctional polymerization initiator.

3. Compositions for paints and printing inks of claim 2 wherein components A and B of said block copolymer are in the form of a clearly-cut block copolymer.

4. Compositions for paints and printing inks of claim 2 wherein the block copolymer is a tapered block copolymer.

5. Compositions for paints and printing inks of claim 1 wherein said polar reactant is an oxygen-, nitrogen- or sulphur-containing compound capable of reacting with said terminal alkali metal to thereby provide said polar group.

6. Compositions for paints and printing inks of claim 1 wherein said polar reactant is a polar monomer capable of being anionically polymerized.

7. Compositions for paints and printing inks of claim 1 wherein said inorganic pigment is a metal compound.

* * * * *